June 27, 1961   J. P. ALDEN ET AL   2,989,844
IGNITION OF SOLID ROCKET PROPELLANTS
Filed Jan. 2, 1957
FIG. 1
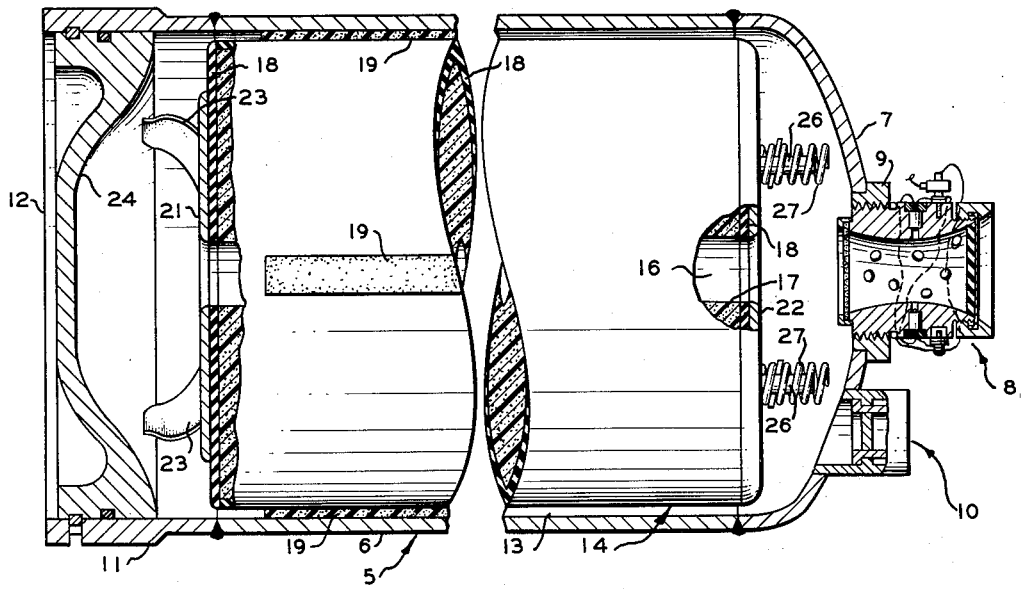
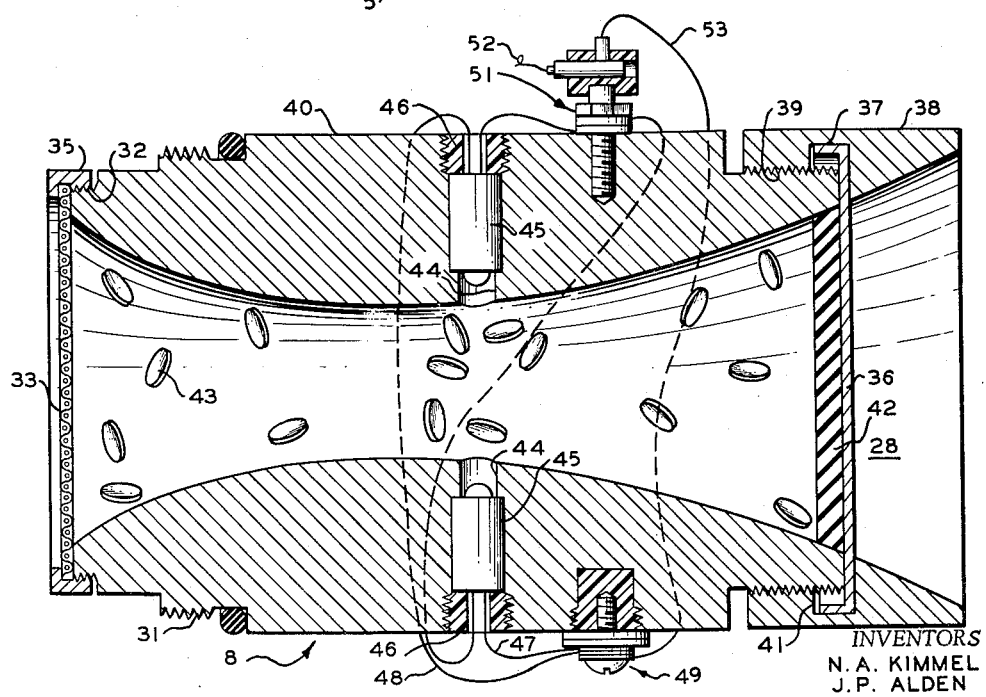
FIG. 2
INVENTORS
N. A. KIMMEL
J. P. ALDEN
BY Hudson & Young
ATTORNEYS

United States Patent Office 2,989,844
Patented June 27, 1961

2,989,844
IGNITION OF SOLID ROCKET PROPELLANTS
John P. Alden, Princeton, N.J., and Norman A. Kimmel, Waco, Tex., assignors to Phillips Petroleum Company, a corporation of Delaware
Filed Jan. 2, 1957, Ser. No. 632,244
3 Claims. (Cl. 60—35.6)

This invention relates to the ignition of solid rocket propellants. In one aspect it relates to a reaction propulsion device having a novel combination of nozzle, igniter and starter disc elements. In a further aspect it relates to an improved rocket motor charged with solid propellant and especially adapted for assisting the take-off of aircraft.

Rocket motors, such as the type with which this invention is concerned, generally comprise a cylindrical casing defining a combustion chamber loaded or charged with a solid rocket propellant which, upon ignition and burning, generates large volumes of gases at high pressures and temperatures. These gaseous products are discharged from the combustion chamber at high velocity through a nozzle located at the rear or aft end of the chamber, thus developing propulsive thrust which propels the rocket motor forward.

An important design criterion for rocket motors is the weight of the rocket chamber and other metal parts. Emphasis is put on minimum weight, since each pound which can be decreased from the rocket chamber and other metal parts (hereinafter referred to as inert rocket components) may be replaced by a pound of useful pay load or propellant charge. This is especially true in the case of high performance rocket motors where the reduced weight of inert rocket components can make the difference between success and failure. In many rocket motors used heretofore, such as those employed in assisting the take-off of aircraft, e.g., JATO units, one factor which contributed to the weight of the inert rocket components was the positioning of a separate igniter assembly in the head end or casing of the rocket motor. The use of a separate igniter assembly entailed the provision of another opening in the casing in addition to that opening necessary for the discharge of gaseous products. This additional opening also entailed the use of a metal boss or other supporting means for the igniter assembly with consequent increase in the weight of inert rocket components. In addition, this opening for the igniter assembly reduced the strength of the casing and meant that sealing means such as a ring seal had to be employed to keep pressures stresses away from critical points and prevent leakage of gases. The possibility also arose of moisture, dust, or other contaminating material entering the combustion chamber through this additional opening. Then, too, the handling and assembling of such rocket motors was involved and sometimes costly.

Accordingly, an object of this invention is to provide an improved rocket motor. Another object is to provide a rocket motor having a novel combination of nozzle, igniter and starter disc elements. Another object is to provide a rocket motor having a separate nozzle with improved igniter means so disposed therein as to increase the ratio of pay load to rocket motor weight. A further object is to provide a rocket motor with novel ignition means so disposed as to increase the strength of the rocket motor casing. A still further object is to provide a rocket motor characterized by ease of handling and assembling and improved operational features, such as low igniter shock. Further objects and advantages of our invention will become apparent, to those skilled in the art, from the following discussion, appended claims and accompanying drawings in which:

FIGURE 1 is a side elevational view in partial longitudinal section of one type of charged rocket motor illustrating the preferred embodiment of our invention; and FIGURE 2 is an enlarged side elevational view of the nozzle section illustrated in FIGURE 1.

Broadly contemplated, the rocket motor of our invention comprises a tubular casing defining a combustion chamber with a separate nozzle of the Venturi type, the inlet end of which is in communication with the aft end of the combustion chamber. Across the inlet end of the nozzle passage is a perforate member such as a wire mesh. Across the diverging section of the nozzle passage is a starter disc. Adjacent the inner face of the starter disc can be positioned a resilient damper member. The cavity or space defined by the inner faces of the perforate and resilient damper members, and the nozzle walls defining that portion of the nozzle passage therbetween, is filled with readily ignitable material which is adapted to be ignited by electro-responsive means.

Referring now to the drawing, in which like parts have been designated with like reference characters, and to FIGURE 1 in particular, a rocket motor generally designated 5 is illustrated and represents one form of a jet propulsion motor which may be employed, for example, to assist the take-off of aircraft. Rocket motor 5 has a cylindrical casing 6 having a reduced aft portion 7 which defines an axial opening which is in communication with a separate nozzle generally designated 8 which is secured to the casing portion 7 by an annular lock member 9. The reduced casing portion 7 has a safety plug attachment generally designated 10 therein capable of releasing excessive pressure from the combustion chamber, in a manner well known to those skilled in the art. The other or head end of the casing 6 is in the form of an enlarged portion 11 and this end of the casing is closed by means of a closure or cap member 12.

The casing 6 defines a combustion chamber 13 in which is loaded a solid rocket propellant grain generally designated 14. This particular grain 14 is cylindrical in shape and has an outer diameter smaller than the inner diameter of the casing 6. The grain 14 is of the internal-burning type by reason of an axial perforation 16 which defines an internal burning surface 17. The outer cylindrical surface and the two ends of the grain 14 are covered with burning restricting material 18. A plurality of resilient retaining pads or strips 19 made of sponge rubber, for example, are placed between the head portion of the grain 14 and the adjacent head portion of casing 6. Retaining end plates 21 and 22 are attached to the ends of the grain 14, adjacent the outer faces of the restricting material attached to these ends. The plates 21 and 22 as well as the restricting material adjacent thereto have axial openings therein which are in alignment with the perforation 16. Secured to the head retaining plate 21 are outer-extending prongs or legs 23 which are adapted to register with the grain retaining assembly 24 which is secured to the inside of the head end of the casing 6. The aft retaining plate 22 has secured to its outer surface a plurality of prongs 26 surrounded by compression springs 27 which are adapted to come into contact with the inside of the reduced portion 7.

Although the rocket motor illustrated in FIGURE 1 illustrates a preferred embodiment of our invention, it is to be understood that our invention is not to be unduly limited thereto. The rocket motor can be charged with other solid propellant grains having different configurations and burning surfaces. For example, the rocket motor can be charged with propellant grains of the external-burning, end-burning, or internal-external-burning types. These grains can be supported by suitable means other than that shown in FIGURE 1. End-burning and internal-burning grains can be bonded to the motor casing. In place of the grain retaining assembly 24, the head retaining plate 21 can be provided with suitable retaining means such as prongs and springs similar to that of the aft retaining plate.

Referring now to FIGURE 2, a description of our novel combination of nozzle, igniter and starter disc elements will now be set forth. The nozzle 8 has an axial Venturi passage 28 defined by the inner walls of the nozzle 8. As employed herein and in the appended claims, the term "throat" designates that portion of the nozzle passage 28 having the smallest cross-sectional area. The outer head end of the nozzle can be provided with a threaded shoulder 31 which is adapted for attachment by lock member 9 to th aft end of the casing of the rocket motor 5 of FIGURE 1. This end of the nozzle 8 can be provided with an additional threaded shoulder 32. Across the inlet end of the nozzle 8 is a perforate member 33, held to the head end of the nozzle by an annular cap 35, the periphery of which is threaded to shoulder 32. In the diverging portion of the nozzle passage 28 beyond the nozzle throat is a starter disc 36 (made of Inconel, copper, aluminum, etc., and designed to burst, for example, at 500 to 1000 p.s.i.) which extends completely across the passage 28; its periphery is provided with a flange. The aft portion of the nozzle 8 is preferably a separate portion 38 in the form of a lock ring which is threadably connected to the aft threaded shoulder 39 of the head nozzle section 40. The aft nozzle section 38 is provided with an inner annular groove 37 to receive the flanged periphery of disc 36.

Adjacent the inner face of starter disc 36 is a resilient damper member 42 (made of rubber or the like) which is preferably cemented to the outer face of starter disc 36 and to the adjacent inner walls of nozzle 8. The cavity or space defined by the inner faces of wire mesh 33 and damper member 42, and the inner walls of the nozzle passage therebetween, is filled with ignition material 43, preferably in the form of discrete particles or pellets. The head nozzle section 40 can be provided with lateral passages 44 in which are placed suitable fuses, matches or squibs 45, which are held in the passageways 44 by insulated connectors 46, which can be made from plastic, which, after the insertion of the fuses, are screwed in place.

Squibs 45 are connected in parallel by lead wires 47, 48, one of their ends being attached to an insulated binding post 49, the other of their ends being attached to a grounded binding post 51. Lead wire 52 supplies current from an external power source, such as a battery, to lead wire 53 which in turn supplies current to lead lines 47, 48. It is apparent that other conventional electro-responsive means can be employed in place of that illustrated.

In the operation of the rocket motor shown in the drawing, upon closing of a suitable switch electric current flows to the fuses 45 which, consequently, function in a well known manner in igniting the igniter material 43. The igniter material 43 in burning forms hot combustion gases which, after being momentarily held back, rupture the rubbery or plastic material covering the perforations of the perforate member 33, which material can be subsequently softened and melted upon being contacted with the hot gases rushing through the perforations. The gases resulting from the burning of igniter material 43 enter the combustion chamber 13 of the rocket motor, establishing desired working pressure and pressure therein and thereby initiating the combustion of the propellant 14 on the burning surfaces 17.

A particular advantage in placing the igniter material 43 in both the converging section and part of the diverging section of the nozzle passage 28 is the consequent jetting of the hot igniter flame through the head or inlet opening in the nozzle 8 into the combustion chamber 13. By this manner of ignition, remote burning surfaces of the propellant are readily contacted with igniter flame and ignited.

The initial ignition of the igniter material 43 often tends to produce a momentary shock or explosion ("igniter shock") which, depending on the type of ignition material employed, might tend to damage or rupture the starter disc, but for the provision of the resilient damper member 42 which cushions or absorbs this momentary shock.

Depending upon the size and geometry of the grain 14 and its burning characteristics, the amount of igniter material and the size of the nozzle 8 can be varied. Depending upon the type of igniter material 43 employed, sufficient material is utilized so as to provide a suitable working pressure in the combustion chamber 13. In the case of JATO units, the combustion pressure may be in the range of 200 to 1500 p.s.i., preferably between 600 and 1000 p.s.i. Should this working pressure be exceeded, the safety plug 10 is adapted to rupture and release excessive pressure. When the ignition material 43 is consumed and the working pressure in the combustion chamber 13 is reached, the starter disc 36 is ruptured or ejected through the aft or outlet end of the nozzle 8. Thereafter, the combustion gases formed by burning the grain 14 leave the combustion chamber through the aft opening in nozzle 8, thereby imparting thrust to the rocket motor.

Combining the nozzle, igniter, and starter disc elements into a separate, integral structure, as disclosed herein, aids in the handling and assembling of the rocket motor in that this structure may be separately stored and shipped in moisture proof containers and readily attached to the rocket motor when the latter is ready for service.

The solid propellants for which the rocket motor of our invention is particularly adapted comprise a fuel and an oxidant for oxidizing the fuel. Ammonium nitrate and ammonium perchlorate are preferably employed as the oxidant whereas the fuel component is generally a hydrocarbon material which serves as a binder for bonding the solid oxidant particles into a solid grain, as well as acting as a fuel. Material suitable for use as the binder include asphalt, rubber, and other tacky hydrocarbon-containing materials. Recently, superior solid propellant materials have been discovered which comprise a major proportion of a solid oxidant, such as ammonium nitrate or ammonium perchlorate, and a minor amount of a rubber binder material, such as a copolymer of a conjugated diene and a vinylpyridine or other substituted heterocycle nitrogen base compound, which after incorporation is cured by a vulcanization or quaternization reaction. Solid propellant mixtures of this type and a process for their production are disclosed and claimed in copending U.S. application Serial No. 284,447, filed April 25, 1952, by W. B. Reynolds and J. E. Pritchard.

The perforate member 33 can be made of a plastic or rubber-coated wire mesh. The wire mesh (metal or plastic filaments) may be made by dipping uncoated mesh into a container of rubber solution or plastic material such as cellulose acetate plastic molding compound, or other suitable covering material which will soften or rupture upon being subjected to heat. Suitable wire mesh can be fabricated from a carbon steel, wire, 6 mesh, 0.035 inch diameter, SAE 1010.

The igniter material 43 is preferably in granular or pelleted form and can be made of any suitable material generally employed in the rocket art for ignition purposes, e.g., black powder, and preferably an especially useful igniter material disclosed and claimed in copending U.S. application, Serial No. 592,995, filed June 21, 1956, by L. G. Herring. As disclosed in the latter mentioned application, the igniter composition is formed of a plurality of discrete particles or pellets comprising powdered metal, powdered inorganic oxidizing material, and ethyl cellulose as a binding agent.

In reducing our invention to practice by actual static firing of our novel rocket motors, the objects of our invention have been generally realized. For purposes of comparison, actual static firings were also conducted on rocket motors having a separate igniter assembly mounted within the head-end of the combustion chamber. Representative firing data comparing a head-end type JATO rocket motor (1,2) with the novel JATO rocket motor of the subject invention (3,4), at different temperatures, is set forth in the following table. The rocket motors in these firings were all charged with similar internal-external burning propellants comprising a rubbery binder (butadiene-methylvinyl pyridine copolymer) and an oxidant (ammonium nitrate). The ignition material employed in all of the fired rocket motors was that set forth in the aforementioned Herring application, in substantially the same amounts.

| Type of JATO Rocket Motor | Firing Temperature, °F. | Nozzle Diameter (in.) | $t_1$ (milliseconds) | $t_2$ (milliseconds) | $t_3$ (milliseconds) | F (lb.) |
|---|---|---|---|---|---|---|
| 1. Separate igniter assembly in head end of chamber | 60 | 0.9600 | 45 | 81 | 110 | 1,668 |
| 2. Separate igniter assembly in head end of chamber | 160 | 1.0400 | 32 | 60 | 74 | 427 |
| 3. Combination nozzle, igniter, starter disc | 60 | 1.0000 | 143 | 46 | 181 | 597 |
| 4. Combination nozzle, igniter, starter disc | 170 | 0.9995 | 112 | 41 | 154 | 122 |

$t_1$=Time elapsed between application of current to igniter and start of pressure rise.
$t_2$=Time elapsed between start of pressure rise and starter disc burst.
$t_3$=Time elapsed between application of current to 50% of maximum operating pressure.
$F$=Ignition shock (thrust) before starter disc rupture.

The above data show, in particular, that although the rocket motors of the subject invention (3,4) exhibited slower ignition than the rocket motors with the separate head-end type igniters (1,2), the former exhibited a lower order of igniter shock than the latter.

Various modifications and alterations of our invention will become apparent, to those skilled in the art, without departing from the scope and spirit of our invention, and it is to be understood that the foregoing description and drawings merely represent a preferred embodiment thereof.

We claim:

1. A reaction propulsion device comprising a tubular casing defining a combustion chamber adapted to be loaded with a solid propellant charge, nozzle means secured to said casing and having a Venturi type passage, said passage having an inlet opening communicating with said chamber and an outlet opening for the discharge of gaseous products, a perforate member positioned across the converging section of said passage so as to completely seal said inlet opening, said perforate member having a plurality of small openings normally closed with material adapted to fail when subjected to heat, an ejectable disc-like obturating member positioned across the diverging section of said passage and removably secured at its periphery to the wall of said nozzle means defining said passage, said obturating member completely sealing said passage and adapted to be displaced so as to open said passage to said chamber when a predetermined pressure is attained within said chamber, ignition material completely filling that portion of said passage between said perforate member and said obturating member, and electro-responsive means extending through the wall of said nozzle and adjacent said ignition material to provide ignition of said ignition material.

2. A rocket motor comprising a tubular casing defining a cylindrical combustion chamber adapted to be loaded with a solid propellant charge, separate nozzle means secured to said casing, said nozzle means having a Venturi type passage in axial alignment with said chamber, said passage having an inlet opening communicating with said chamber and an outlet opening for discharge of gaseous products, a perforate member secured to said nozzle across the converging section of said passage so as to completely seal said inlet opening, said perforate member having a plurality of small openings normally closed with material adapted to fail when subjected to heat, an ejectable obturating member secured to said nozzle across the diverging section of said passage and removably secured at its periphery to the wall of said nozzle means defining said passage, said obturating member completely sealing said passage and adapted to be displaced so as to open said passage to said chamber when a predetermined pressure is attained within said chamber, a resilient damper member across said passage and adjacent the inner face of said obturating member, particulate ignition material completely filling that portion of said passage between said perforate and damper members, and electro-responsive means extending through the wall of said nozzle and adjacent said ignition material to provide ignition of said ignition material.

3. A rocket motor comprising a tubular casing defining a cylindrical combustion chamber adapted to be loaded with a solid, cylindrical, propellant grain, separate nozzle means axially secured to the aft end of said casing, said nozzle means comprising head and aft members threadedly secured to each other and defining a Venturi type passage, the latter having an inlet opening communicating with said chamber and an outlet opening for discharge of gaseous products from said chamber, a wire mesh member secured to said head nozzle member across the converging section of said passage so as to completely seal said inlet opening, said mesh member being coated with material which will fail under subjection to heat, a starter disc across the diverging section of said passage, the periphery of said starter disc being secured between said head and aft nozzle members, said starter disc completely sealing said passage and adapted to be displaced and ejected from said passage so as to open said passage to said chamber when a predetermined pressure is attained within said chamber, a rubbery damper disc positioned completely across said passage and adjacent the inner face of said starter disc, pelleted ignition material completely filling that portion of said passage between said mesh and damper members, lateral bores in said head nozzle member communicating with said portion of said passage, and electrically responsive members in said lateral bores adjacent said ignition material and adapted to ignite the same.

References Cited in the file of this patent

UNITED STATES PATENTS

| 2,440,271 | Hickman | Apr. 27, 1948 |
| 2,515,049 | Lauritsen | July 11, 1950 |
| 2,561,670 | Miller et al. | July 24, 1951 |
| 2,791,962 | Terce | May 14, 1957 |